(12) United States Patent
Kennedy et al.

(10) Patent No.: US 7,465,146 B2
(45) Date of Patent: Dec. 16, 2008

(54) METHODS AND SYSTEMS FOR TURBINE ROTOR BALANCING

(75) Inventors: Dale Michael Kennedy, Cincinnati, OH (US); Wayne Garcia Edmondson, Sr., West Chester, OH (US)

(73) Assignee: General Electric Company, Schenectady, NY (US)

( * ) Notice: Subject to any disclaimer, the term of this patent is extended or adjusted under 35 U.S.C. 154(b) by 490 days.

(21) Appl. No.: 11/294,863

(22) Filed: Dec. 5, 2005

(65) Prior Publication Data

US 2007/0128385 A1    Jun. 7, 2007

(51) Int. Cl.
*F04D 27/00* (2006.01)
(52) U.S. Cl. .......................... 415/1; 415/144; 415/145; 415/201; 74/572.1; 74/572.4
(58) Field of Classification Search .................. 416/19, 416/144, 145; 415/201, 1; 411/375
See application file for complete search history.

(56) References Cited

U.S. PATENT DOCUMENTS

| | | | | |
|---|---|---|---|---|
| 3,848,769 A | * | 11/1974 | Beil ........................... 220/845 |
| 3,999,888 A | * | 12/1976 | Zincone ...................... 416/145 |
| 4,856,964 A | * | 8/1989 | Stock .......................... 415/201 |
| 4,872,810 A | | 10/1989 | Brown et al. |
| 4,976,585 A | * | 12/1990 | Mezzedimi et al. ......... 415/118 |
| 5,167,167 A | | 12/1992 | Tiernan, Jr. et al. |
| 5,273,398 A | * | 12/1993 | Reinfelder et al. .......... 416/144 |
| 5,275,536 A | | 1/1994 | Stephens et al. |
| 5,277,063 A | | 1/1994 | Thomas |
| 5,545,010 A | * | 8/1996 | Cederwall et al. ........... 416/145 |
| 5,832,714 A | * | 11/1998 | Hines ........................... 60/774 |
| 6,588,298 B2 | | 7/2003 | Czerniak et al. |
| 6,634,842 B2 | * | 10/2003 | Ueno .......................... 411/377 |
| 2002/0134191 A1 | | 9/2002 | Czerniak et al. |
| 2003/0213334 A1 | | 11/2003 | Czerniak et al. |

* cited by examiner

*Primary Examiner*—Edward Look
*Assistant Examiner*—Aaron R Eastman
(74) *Attorney, Agent, or Firm*—William Scott Andes, Esq.; Armstrong Teasdale LLP

(57) ABSTRACT

Methods and apparatus for a balance weight access assembly are provided. The assembly includes an access cover, and an access tube including a first opening, a second opening, and a substantially hollow body extending therebetween. The first opening is positioned proximate to a balance weight retainer, the second opening is positioned proximate to the access cover, and the body is positioned in substantial alignment with an installation axis of the balance weight retainer.

20 Claims, 4 Drawing Sheets

METHODS AND SYSTEMS FOR TURBINE ROTOR BALANCING

STATEMENT REGARDING FEDERALLY SPONSORED RESEARCH & DEVELOPMENT

The U.S. Government may have certain rights in this invention pursuant to contract number N00019-96-C-0176.

BACKGROUND OF THE INVENTION

This invention relates generally to balancing a rotor in a gas turbine and, more particularly, to in-situ gas turbine rotor balancing.

Current military engines have turbine rotors that require periodic balancing. At least some known engines need to be removed from their nacelle to access the turbine rotor for balancing. In a shop, the engines need to be at least partially disassembled to access the turbine rotor for balancing. For example, the rotor module is pre-balanced before engine assembly. After engine assembly, the engine is spooled up to check the balance of the rotor. If the rotor is out of balance, the engine is disassembled and the rotor module would be re-balanced. However, engine disassembly is both time consuming and expensive.

BRIEF DESCRIPTION OF THE INVENTION

In one embodiment, a balance weight access assembly includes an access cover, and an access tube including a first opening, a second opening, and a substantially hollow body extending therebetween. The first opening is positioned proximate to a balance weight retainer, the second opening is positioned proximate to the access cover, and the body is positioned in substantial alignment with an installation axis of the balance weight retainer.

In another embodiment, a method for assembling a gas turbine engine includes providing a coverable aperture between a flow path of combustion gases through the gas turbine engine and an engine cooling circuit, and coupling an access tube to the gas turbine engine in substantial alignment between a balance weight retainer on a rotor of the gas turbine engine and the aperture.

In yet another embodiment, a gas turbine engine includes a low pressure turbine, and a balance weight access assembly coupled in a position adjacent the low pressure turbine. The balance weight access assembly including an access cover, and an access tube including a first opening, a second opening, and a substantially hollow body extending therebetween, the first opening positioned proximate to a balance weight retainer coupled to the low pressure turbine, the second opening positioned proximate to the access cover, the body in substantial alignment with an installation axis of the balance weight retainer.

DETAILED DESCRIPTION OF THE INVENTION

Figure 1:
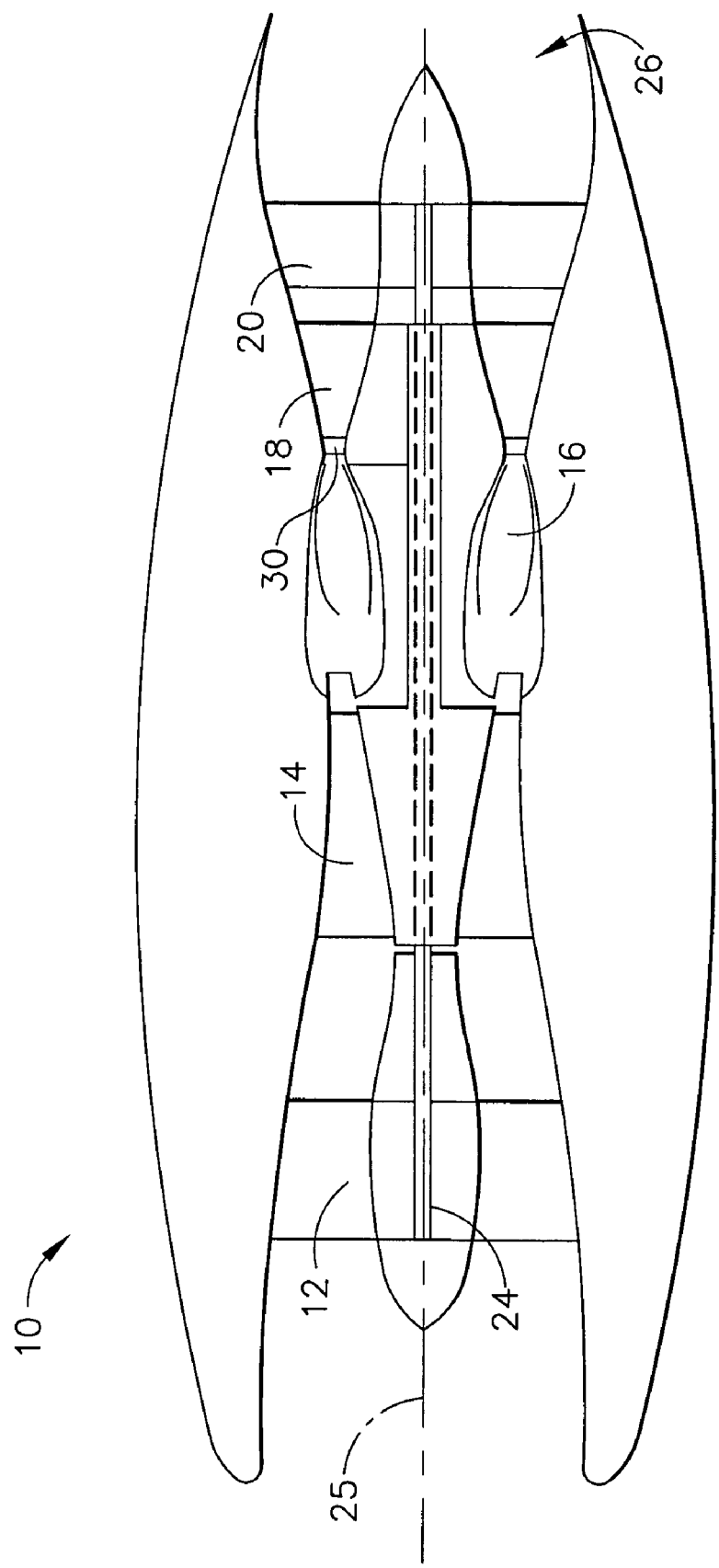
FIG. 1 is a schematic illustration of an exemplary gas turbine engine.

FIG. 1 is a schematic illustration of a gas turbine engine 10 including a fan assembly 12, a high pressure compressor 14, and a combustor 16. Gas turbine engine 10 also includes a high pressure turbine 18 and a low pressure turbine 20.

In operation, air flows through fan assembly 12 and compressed air is supplied from fan assembly 12 to high pressure compressor 14. The highly compressed air is delivered to combustor 16. The combustion exit gases are delivered from combustor 16 through a nozzle 30 to a high pressure turbine 18. Flow from combustor 16 drives high pressure turbine 18 and a low pressure turbine 20 coupled to a rotatable main turbine shaft 24 aligned with a longitudinal axis 25 of gas turbine engine 10 in an axial direction and exits gas turbine engine 10 through an exhaust system 26.

Figure 2:
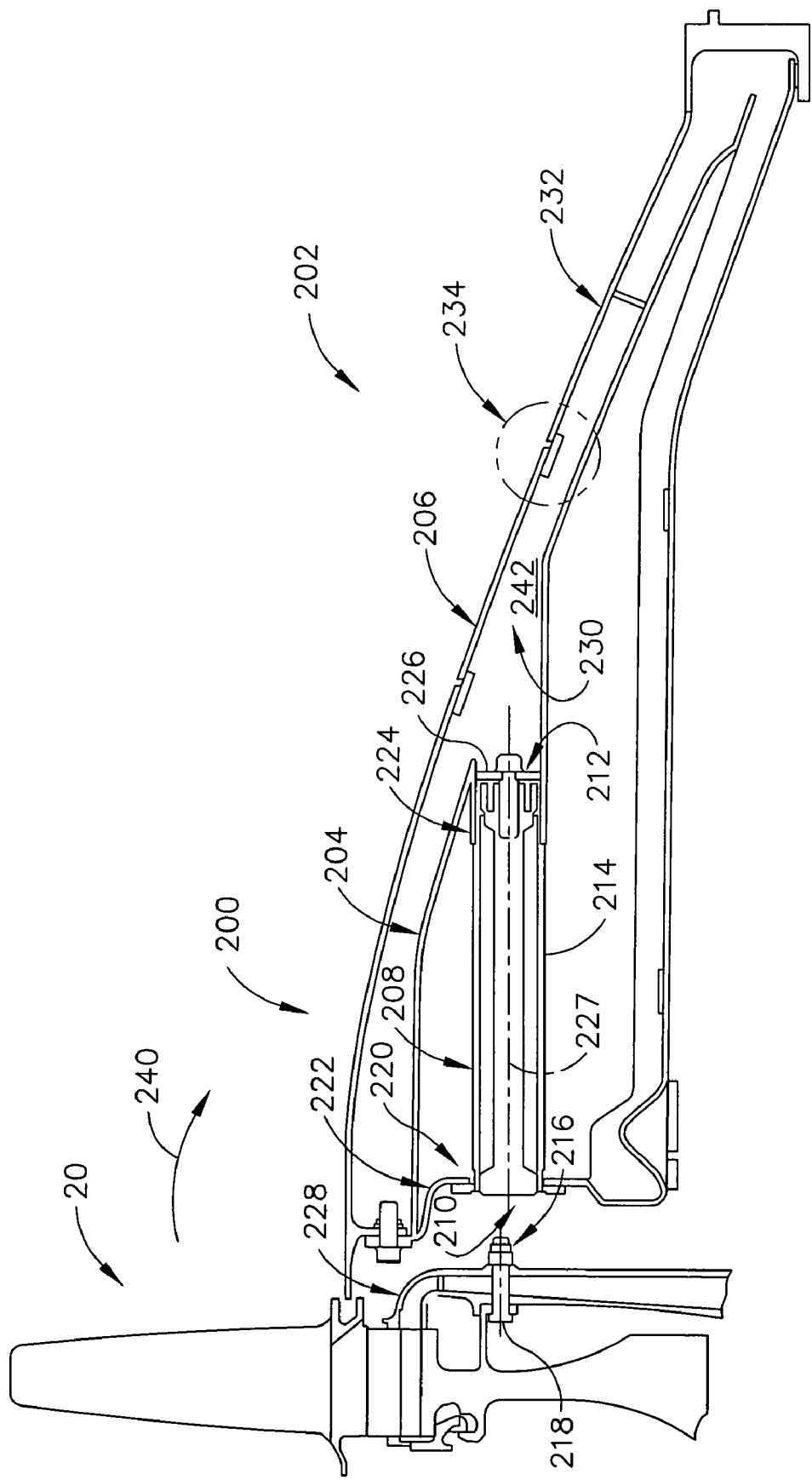
FIG. 2 is a partial sectional view of an outlet of a third stage of the low pressure turbine that may be used with the gas turbine engine shown in FIG. 1.

FIG. 2 is a partial sectional view of an outlet 200 of a third stage of the low pressure turbine 20 (shown in FIG. 1). Gas turbine engine 10 includes a balance weight access assembly 202 coupled to a baffle assembly centerbody 204 positioned adjacent low pressure turbine 20. In the exemplary embodiment, balance weight access assembly 202 includes an access cover 206 and an access tube 208 having a first opening 210, a second opening 212, and a substantially hollow body 214 extending therebetween. First opening 210 is positioned proximate to a balance weight retainer 216 coupled to low pressure turbine 20. Second opening 212 is positioned proximate to access cover 206. Body 214 is maintained in substantial alignment with an installation axis 218 of balance weight retainer 216. An upstream end 220 of tube 208 is coupled to a forward baffle 222 and a downstream end 224 of tube 208 is coupled to baffle assembly centerbody 204. In the exemplary embodiment, a plug 226 includes and elongate body 227 of sufficient length to block opening 210 while coupled to tube 208 at second opening 212 to substantially block fluid flow through 208 tube. Balance weight retainer 216 is coupled to a rotor rim 228 of low pressure turbine 20, for example, the third stage rotor rim. Access cover 206 is configured to substantially block an aperture 230 fabricated in a frame centerbody liner 232. Aperture 230 permits access to downstream end 224 and plug 226. An area 234 is shown in detail in FIG. 3.

During balancing, access cover 206 is removed from aperture 230, permitting access to downstream end 224 and plug 226. Plug 226 can then be removed from opening 212 to provide access to balance weight retainer 216. Tube 208 is maintained in substantial alignment with installation axis 218 of the balance weight retainer so that a tool (not shown) can be inserted through aperture 230 into tube 208 and be guided to balance weight retainer 216. Balance weight can then be added, removed, and/or adjusted to rotor 228 using balance weight retainer 216. After adjusting the balance weight, the tool is removed, plug 226 is reinstalled, and cover 206 is reinstalled. The exemplary embodiment of the present invention permits balancing low pressure turbine rotor 20 without removing engine 10 from a test stand (not shown) or disassembly of an augmenter module (not shown) coupled to a downstream end of engine 10. In the field, balance weight access assembly 202 permits turbine rotor balancing without removing engine 10 from the nacelle.

During operation of engine 10, combustion gases are exhausted from low pressure turbine 20 and flow in a direction 240. Cooling air is channeled about baffle assembly centerbody 204 in a plenum 242. Cover 206 substantially prevents the combustion gases from entering plenum 242. Plug 226 prevents a disruption of the gases in the cooling circuit in plenum 242.

Figure 3:
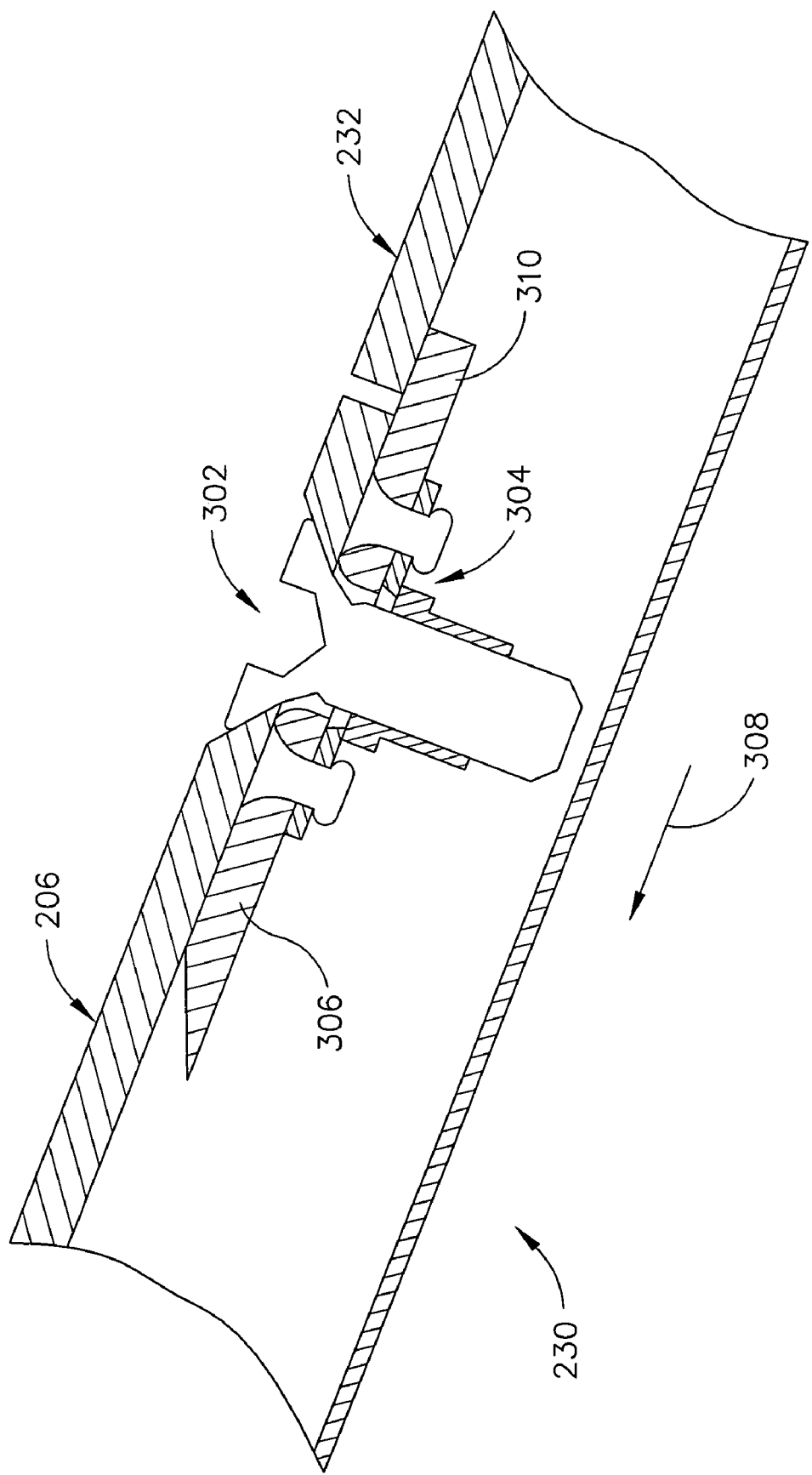
FIG. 3 is an enlarged cross-sectional view of a portion of the cover and the liner shown in FIG. 2.

FIG. 3 is an enlarged cross-sectional view of a portion of cover 206 and liner 232. In the exemplary embodiment, cover 206 includes at least one fastener 302 configured to couple cover 206 to liner 232. In the exemplary embodiment, a backing strip 304 is fixedly coupled to liner 232 about a periphery of aperture 230 such that backing strip 304 provides a mating surface 306 for cover 206. In the exemplary embodiment, backing strip 304 includes a plurality of holes spaced about aperture 230. Each hole includes a receptacle 308 configured to receive and engage fastener 302. In the exemplary embodiment, fastener 302 screwably engages receptacle 308 such that cover 206 may be removably coupled in place over aperture 230.

Figure 4:
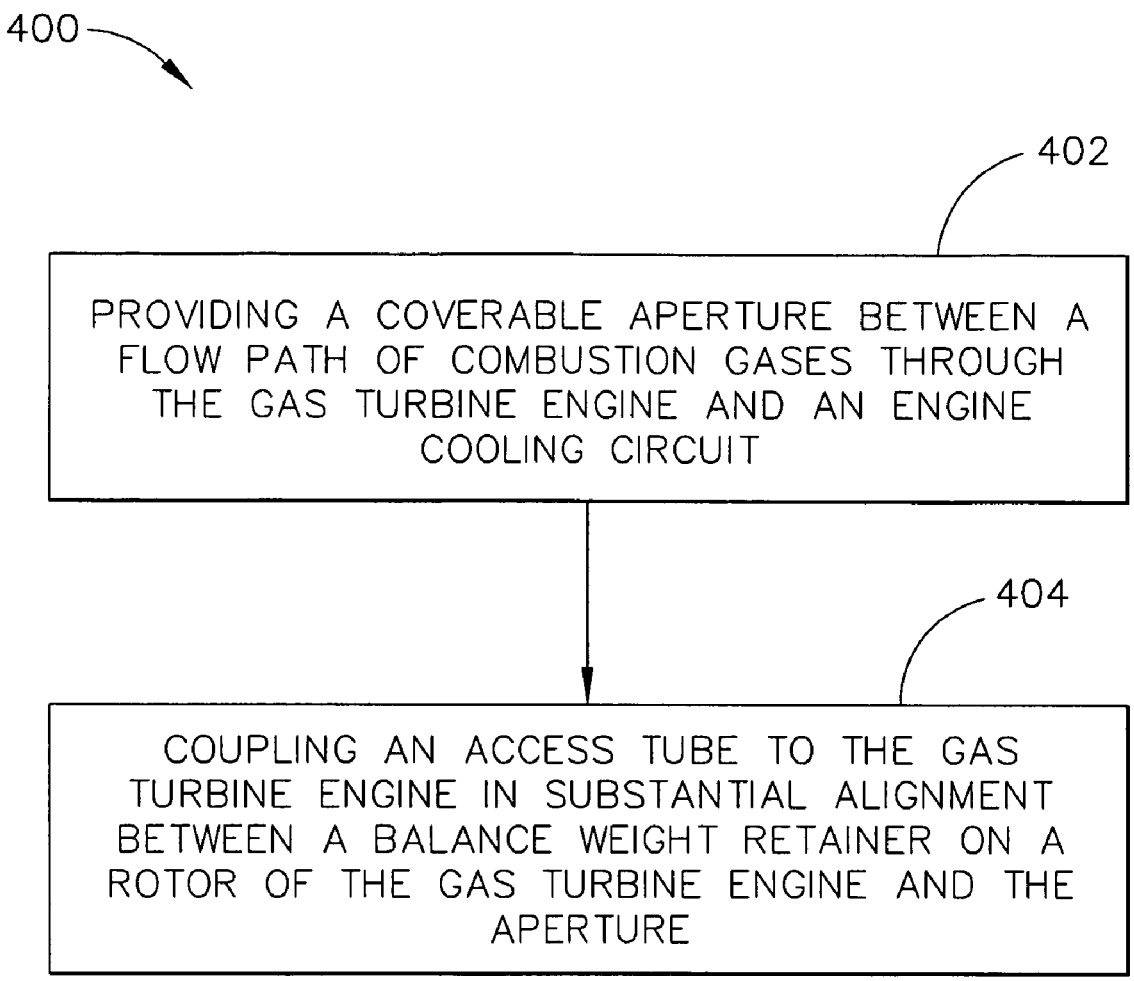
FIG. 4 is a flow diagram of an exemplary method of assembling a gas turbine engine.

FIG. 4 is a flow diagram of an exemplary method 400 of assembling a gas turbine engine. The method includes providing 402 a coverable aperture between a flow path of combustion gases through the gas turbine engine and an engine cooling circuit, and coupling 404 an access tube to the gas turbine engine in substantial alignment between a balance weight retainer on a rotor of the gas turbine engine and the aperture.

The above-described balance weight access assembly is a cost-effective and highly reliable method and apparatus for balancing a rotatable member such as a low pressure turbine rotor without removing the gas turbine engine from a test stand or disassembling the engine augmenter module. The assembly prevents mixing of hot exhaust gases and cooling gases at the exhaust of the low pressure turbine and further prevents disruption of the cooling circuit flow. Accordingly, the balance weight access assembly facilitates balancing of gas turbine engine components, in a cost-effective and reliable manner.

Exemplary embodiments of balance weight access assembly components are described above in detail. The components are not limited to the specific embodiments described herein, but rather, components of each assembly may be utilized independently and separately from other components described herein. Each balance weight access assembly component can also be used in combination with other balance weight access assembly components.

What is claimed is:

1. A balance weight access assembly comprising:
   an access cover;
   a plenum defined adjacent to said access cover;
   a cooling circuit coupled in flow communication with said plenum, said cooling circuit configured to channel cooling air to said plenum; and
   an access tube comprising a first opening, a second opening, and a substantially hollow body extending therebetween, said first opening positioned proximate to a balance weight retainer, said second opening positioned proximate to said plenum, said body in substantial alignment with an installation axis of the balance weight retainer.

2. An assembly in accordance with claim 1 further comprising a plug configured to substantially block fluid flow through said tube.

3. An assembly in accordance with claim 1 wherein said balance weight retainer is coupled to a rotor of a rotatable machine.

4. An assembly in accordance with claim 1 wherein said balance weight retainer is coupled to a turbine rotor of a gas turbine engine.

5. An assembly in accordance with claim 1 wherein said tube is coupled to a baffle assembly centerbody of a gas turbine engine.

6. An assembly in accordance with claim 1 wherein an upstream end of said tube is coupled to a forward baffle of a baffle assembly centerbody of a gas turbine engine.

7. An assembly in accordance with claim 1 wherein a downstream end of said tube is coupled to a baffle assembly centerbody of a gas turbine engine.

8. A method for assembling a gas turbine engine, said method comprising:
   providing a coverable aperture between a flow path of combustion gases through the gas turbine engine and an engine cooling circuit, wherein the aperture is positioned to receive cooling air channeled through the engine cooling circuit; and
   coupling an access tribe to the gas turbine engine in substantial alignment between a balance weight retainer on a rotor of the gas turbine engine and the aperture.

9. A method in accordance with claim 8 wherein providing a coverable aperture comprises providing a cover configured to couple to a liner separating the flow path from the engine cooling circuit such that a flow of combustion gases through the aperture is substantially blocked.

10. A method in accordance with claim 8 wherein providing a coverable aperture comprises providing a cover configured to couple to a liner using removable fasteners.

11. A method in accordance with claim 8 wherein coupling an access tube to the gas turbine engine comprises coupling an upstream end of the access tube to a forward baffle of the gas turbine engine.

12. A method in accordance with claim 8 wherein coupling an access tube to the gas turbine engine comprises coupling a downstream end of the access tube to a baffle assembly centerbody of the gas turbine engine.

13. A method in accordance with claim 8 further comprising coupling a plug to the access tube such that a flow through the aperture is substantially blocked.

14. A gas turbine engine comprising:
   a turbine; and
   a balance weight access assembly coupled in a position adjacent said turbine, said balance weight access assembly comprising:
   an access cover;
   a plenum defined adjacent to said access cover;
   a cooling circuit coupled in flow communication with said plenum, said cooling circuit configured to channel cooling air to said plenum; and
   an access tube comprising a first opening, a second opening, and a substantially hollow body extending therebetween, said first opening positioned proximate to a balance weight retainer coupled to said turbine, said second opening positioned proximate to said plenum, said body in substantial alignment with an installation axis of the balance weight retainer.

15. A gas turbine engine in accordance with claim 14 further comprising a plug configured to substantially block fluid flow through said tube.

16. A gas turbine engine in accordance with claim 14 wherein said balance weight retainer is coupled to the turbine.

17. A gas turbine engine in accordance with claim 14 wherein said balance weight retainer is coupled to a third stage rotor rim of the turbine.

18. A gas turbine engine in accordance with claim 14 wherein said tube is coupled to a baffle assembly centerbody of the gas turbine engine.

19. A gas turbine engine in accordance with claim 14 wherein an upstream end of said tube is coupled to a forward baffle of a baffle assembly centerbody of the gas turbine engine.

20. A gas turbine engine in accordance with claim 14 wherein a downstream end of said tube is coupled to a baffle assembly centerbody of a gas turbine engine.

* * * * *